(12) United States Patent
El-Wardany et al.

(10) Patent No.: US 9,533,371 B2
(45) Date of Patent: Jan. 3, 2017

(54) APPARATUS AND METHOD FOR ON LINE SURFACE ENHANCEMENT OF A WORKPIECE

(75) Inventors: Tahany Ibrahim El-Wardany, Bloomfield, CT (US); Daniel V. Viens, Mansfield Center, CT (US); Robert A. Grelotti, Colchester, CT (US); Joseph J. Sangiovanni, West Suffield, CT (US); John F. Zimmerman, South Glastonbury, CT (US); Yan Zhang, Vernon, CT (US)

(73) Assignee: United Technologies Corporation CT (US)

( * ) Notice: Subject to any disclaimer, the term of this patent is extended or adjusted under 35 U.S.C. 154(b) by 786 days.

(21) Appl. No.: 13/351,380

(22) Filed: Jan. 17, 2012

(65) Prior Publication Data

US 2013/0180968 A1    Jul. 18, 2013

(51) Int. Cl.
| | |
|---|---|
| *B23K 26/00* | (2014.01) |
| *B23P 23/04* | (2006.01) |
| *B23P 9/04* | (2006.01) |
| *C21D 7/06* | (2006.01) |
| *C21D 9/00* | (2006.01) |
| *B23K 101/00* | (2006.01) |

(52) U.S. Cl.
CPC ....... *B23K 26/0093* (2013.01); *B23K 26/0069* (2013.01); *B23P 9/04* (2013.01); *B23P 23/04* (2013.01); *C21D 7/06* (2013.01); *B23K 2201/001* (2013.01); *C21D 9/0068* (2013.01); *Y10T 29/49995* (2015.01); *Y10T 29/5122* (2015.01)

(58) Field of Classification Search
CPC ........... C21D 7/06; C21D 10/005; C21D 7/00; C21D 1/09; B21D 53/78; B01J 19/08;B01J 21/00; B21J 1/00; B23K 26/14; B23K 26/0093; B23K 26/0069; B21B 39/20; B21C 1/00; B23P 23/00; B23P 23/02; B23P 23/04; B23P 23/06; B23P 25/00; B23P 25/003; B23P 9/04
USPC ....... 72/53, 234; 29/90.7, 50, 557, 558, 889; 83/76.1, 76.6, 663, 666, 672; 219/121.85
See application file for complete search history.

(56) References Cited

U.S. PATENT DOCUMENTS

| | | | |
|---|---|---|---|
| 4,224,356 A | * | 9/1980 | Singer ........................... 427/455 |
| 4,937,421 A | | 6/1990 | Ortiz, Jr. et al. |
| 5,131,957 A | | 7/1992 | Epstein et al. |
| 5,531,570 A | | 7/1996 | Mannava et al. |
| 5,744,781 A | * | 4/1998 | Yeaton ..................... 219/121.84 |
| 5,790,620 A | | 8/1998 | Okazaki et al. |

(Continued)

FOREIGN PATENT DOCUMENTS

| | | |
|---|---|---|
| DE | 10 2007 032044 A1 | 1/2009 |
| EP | 1 961 514 A1 | 8/2008 |

OTHER PUBLICATIONS

Extended European Search Report from EP Application Serial No. 13151750.0, dated May 23, 2013, 8 pages.

(Continued)

*Primary Examiner* — Sunil K Singh
*Assistant Examiner* — Gregory Swiatocha
(74) *Attorney, Agent, or Firm* — Kinney & Lange, P.A.

(57) ABSTRACT

An apparatus to cut and surface process a workpiece includes a cutting tool to cut the workpiece; a peening tool to peen surfaces of the cut workpiece; and a controller to control the cutting tool, the peening tool and the workpiece to move simultaneously.

1 Claim, 5 Drawing Sheets

(56) References Cited

U.S. PATENT DOCUMENTS

| | | | |
|---|---|---|---|
| 6,084,202 A | 7/2000 | Okazaki et al. | |
| 6,144,012 A * | 11/2000 | Dulaney et al. | 219/121.85 |
| 6,288,358 B1 | 9/2001 | Dulaney et al. | |
| 6,305,446 B1 * | 10/2001 | Showan | B23Q 39/026 |
| | | | 144/135.2 |
| 6,541,733 B1 | 4/2003 | Mannava et al. | |
| 6,711,928 B1 * | 3/2004 | Easterbrook | B21C 23/001 |
| | | | 29/525.06 |
| 6,818,854 B2 | 11/2004 | Friedman et al. | |
| 6,875,953 B2 * | 4/2005 | Clauer et al. | 219/121.85 |
| 6,923,877 B1 * | 8/2005 | Anderson | 148/525 |
| 7,204,677 B2 * | 4/2007 | Mannava et al. | 416/241 R |
| 7,273,998 B2 | 9/2007 | Wu et al. | |
| 7,321,105 B2 | 1/2008 | Clauer et al. | |
| 7,682,112 B2 * | 3/2010 | Panczuk et al. | 409/132 |
| 7,718,921 B2 * | 5/2010 | Dane et al. | 219/121.73 |
| 7,897,895 B2 | 3/2011 | Lawrence | |
| 8,051,565 B2 * | 11/2011 | Luna | B23P 6/002 |
| | | | 29/889.7 |
| 8,319,150 B2 * | 11/2012 | Lawrence et al. | 219/121.81 |
| 8,375,542 B2 * | 2/2013 | Mielke | 29/90.7 |
| 8,601,659 B2 * | 12/2013 | Prevey | B24B 39/003 |
| | | | 29/407.08 |
| 8,776,357 B2 * | 7/2014 | Hyatt et al. | 29/557 |
| 2002/0000428 A1 * | 1/2002 | Dulaney et al. | 219/121.69 |
| 2003/0052103 A1 | 3/2003 | Friedman et al. | |
| 2004/0232125 A1 | 11/2004 | Clauer et al. | |
| 2007/0186416 A1 * | 8/2007 | Birkner et al. | 29/889.1 |
| 2007/0262063 A1 * | 11/2007 | Sano et al. | 219/121.85 |
| 2012/0216587 A1 | 8/2012 | Webster | |

OTHER PUBLICATIONS

Article entitled, "Technical Aspects of Shot Peening Machinery and Media", H.J. Plaster, The Shot Peener, vol. 14, Issue 2, pp. 5-10.

* cited by examiner

APPARATUS AND METHOD FOR ON LINE SURFACE ENHANCEMENT OF A WORKPIECE

BACKGROUND

Rotating turbo machinery, such as fan blades, turbine and compressor components, experience high vibration and tensile stresses during operation. These stresses make the components susceptible to high cycle fatigue (HCF) and stress corrosion cracking (SCC) failure mechanisms, which limit the service life of the components. Prolonged exposure to extreme operating conditions can also lead to the development of fatigue cracks in areas of the component subject to high operational stresses. HCF life is also reduced by the occurrence of foreign object damage (FOD). FOD locations act as stress concentrators that speed up the initiation and propagation of fatigue cracks. FOD, especially along the blade leading and trailing edges, significantly reduces the service life of aerospace components.

HCF, SCC, and FOD necessitate periodic inspection and repair or replacements of limited life parts (LLP) in an engine if any cracks or specific FOD depth is found. The periodic inspection of parts increases maintenance cost, and the replacements of the parts usually affects the flight readiness and operating costs of the engine. Integrally bladed rotors (IBRs) are one of the most expensive component in an engine because of the limited life and required inspection and maintenance due to stress related failure mechanisms and FOD. If a blade on an IBR is damaged, the whole IBR will be removed from the engine to be repaired or replaced. The repair and/or replacement of such a complex component is expensive and takes a significant amount of time. IBRs can be made with a five axis milling machine tool that is controlled digitally with computer numerical controls (CNCs).

Surface enhancements of blades (including IBRs) increase their fatigue strength, FOD tolerance, resistance to stress related failure mechanisms and save in maintenance costs. This enhancement can be achieved through a peening process, which induces compressive residual stress to the surface of the blade. The magnitude and depth of the residual stress depend on the method used to peen the surface.

Laser shock peening ("LSP") is one of several peening processes that can be used to enhance surface properties of parts. LSP is often used to enhance surface properties and increase the resistance of aircraft gas turbine engine compressor components and fan blades to FOD, improving high cycle fatigue life. LSP can create about 1 to 2 mm depth of residual compressive stresses into part surfaces to inhibit the initiation and propagation of fatigue cracks.

SUMMARY

An apparatus to cut and surface process a workpiece includes a cutting tool to cut the workpiece; a peening tool to peen surfaces of the cut workpiece; and a controller to control the cutting tool, the peening tool and the workpiece to move simultaneously 1.

DETAILED DESCRIPTION

The present invention involves an apparatus and a method for inducing compressive residual stresses to a workpiece while it is being machined. This can be especially useful in integrally bladed rotors (IBRs) to improve the fatigue performance and FOD tolerance of the rotor. An integrated manufacturing and peening apparatus is used for on-line laser peening of critical engine parts to allow for the peening of the part while it is still on its fixture on the milling or turning machine. This will eliminate the need for a special peening machine and reduce the cost and time of part manufacturing and processing.

Figure 1:
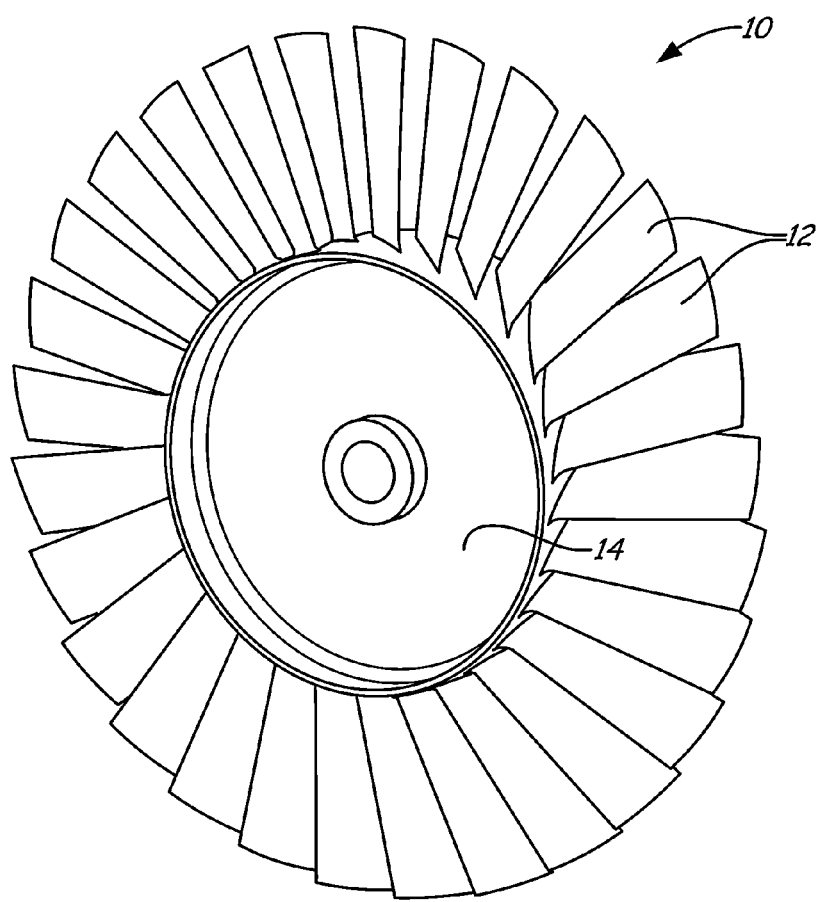
FIG. 1 is a perspective view of an integrally bladed rotor.

FIG. 1 is a perspective view of integrally bladed rotor 10 with blades 12 and disc 14. Rotor 10 is formed by machining blades 12 and disc from one workpiece. IBR 10 can be made of titanium (including alloys) or other materials depending on system requirements.

Forming IBR 10 typically involves a complicated and costly machining and finishing process. Therefore it is essential to enhance blades 12 to increase FOD tolerance, fatigue strength and resistance to stress related failure mechanisms.

Figure 2A:
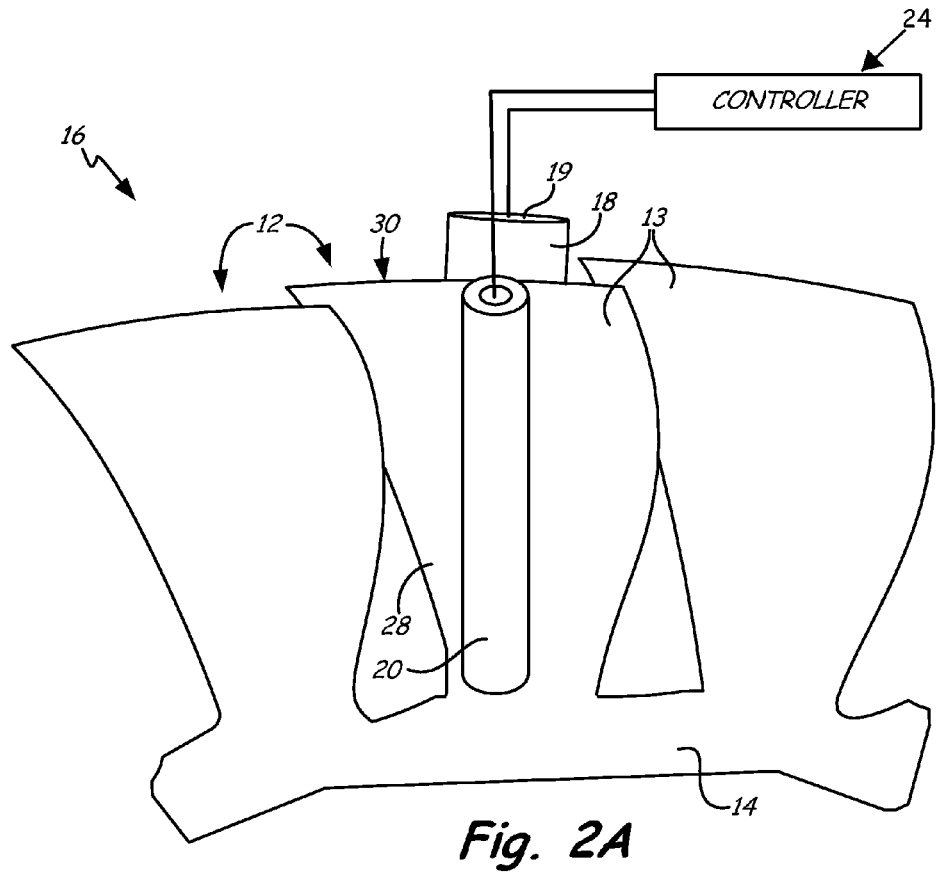
FIG. 2A is a perspective view of a portion of an integrally bladed rotor being machined and peened by an integrated manufacturing and laser peening apparatus.
Figure 2B:
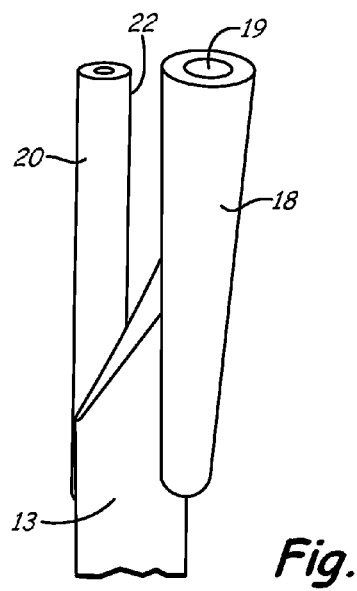
FIG. 2B is a close-up view of the integrated manufacturing and laser peening apparatus of FIG. 2A with a portion of an airfoil removed for viewing purposes.

FIG. 2A is a perspective view of a portion of IBR 10 being machined and peened by integrated manufacturing and peening apparatus 16. FIG. 2B is a close-up view of integrated manufacturing and peening apparatus 16 with a portion of airfoil 13 removed for viewing purposes. IBR 10 includes blades 12 (with airfoils 13) and disc 14. Integrated manufacturing and peening apparatus 16 includes cutting tool 18 (with spindle 19), peening tool 20 (with fiber optics to produce line laser 22) and controller 24. Airfoils 13 include first surface 28 and second surface 30. Cutting tool 18 and peening tool 20 are connected and managed by controller 24. The connection can be through wires, or wireless. Apparatus 16 can be made from an existing machining system, and modified to include peening tool 20, utilizing cutter paths as peening paths.

Cutting tool 18 can be part of a modified conventional five axis milling machining system which attaches a workpiece to a fixture. When the workpiece is connected to the fixture, cutting tool 18 is controlled digitally by controller 24 using computer numerical control (CNC) to cut workpiece to form IBR 10.

Peening tool 20 is a laser shock peening (LSP) tool that introduces compressive residual stresses to a surface which has been machined. Stresses are induced by focusing a laser at the surface. The laser used for LSP generates shock waves on the surface due to ablation of material layer as a result of intensive absorption of laser radiation. The surface transforms from solid to vapor, forming a plasma to absorb energy directly from the laser radiation and from a reflection of the surface. The plasma then expands and generates a shockwave. The shockwave propagates to create permanent strain and residual compressive stress, which remain on the surface. With LSP, a high pressure coolant system can be used to produce a water layer transparent to the laser to limit expansion of the plasma. This confines the plasma to increase surface pressure up to about 10 times the surface pressure of unconfined plasma and reduces the amount of melted surface material generated by the laser. The high pressure coolant system can be connected to and controlled by the controller. LSP can generate a compression depth of about 1 mm from the peened surface. As can be seen, peening tool 20 is positioned relative to blade 12 to peen a surface of blade 12.

Controller 24 controls cutting tool 18 and peening tool 20 to machine and peen workpiece surface before finishing it into IBR 10. Controller 24 can also control the motion of IBR 10. Controller 24 coordinates cutting tool 18 and peening tool 20 to machine first surface 28 with cutting tool 18 (not shown), and then peen first surface 28 with peening tool 20. Controller 24 can move cutting tool 18 to machine second surface 30 while peening tool 20 is peening first surface 28 (FIG. 2). Alternatively, controller 24 can move cutting tool 18 to simply support (and not cut) second surface 30 that is adjacent to first surface 28 while peening tool 20 is peening first surface 28. This can help to guard against deformation in airfoil 13 from LSP. Additionally, controller 24 can regulate laser 22 intensity in peening tool 20 to generate desired levels of compressive stress on surfaces of airfoil 13.

IBR 10 can be formed and the surface enhanced efficiently and economically by using integrated manufacturing and peening apparatus 16. Past systems formed IBR by: first machining IBR with a conventional machining tool, removing IBR from the fixture of the machine tool, shipping it to a different facility to be laser peened, painting IBR in preparation for the peening process, fixing on a machine to be laser shock peened, and then putting IBR back on the fixture of the machining tool to obtain the required precise surface finish. Integrated manufacturing and peening apparatus 16 allows for simultaneous machining and surface peening through the use of cutting cool 18 and peening tool 20. Additionally, apparatus 16 eliminates the inefficiencies of having to remove IBR 10 from the machining fixture to perform finishing steps, such as peening, and then place it back in the fixture to machine finish. Cutting tool 18 can simply machine a surface, then peening tool 20 can peen the surface, and, if necessary, cutting tool 18 can come back over the surface to machine finish it.

In addition, past systems for peening IBRs involved the use of laser absorbent coatings or tape to increase pressure and protect surfaces from damage by ablation and melting. This was intended to eliminate the need to machine finish the part after peening, which was costly and time-consuming. However, machine finishing was still often needed due to some deformation or tears in the coating or tape which resulted in ablation and melting by the peening laser. Integrated apparatus 16 eliminates the need for the coatings due to IBR 10 being in the fixture for the entire process. If peening causes ablation and melting on IBR, cutting tool 18 can easily make a second pass to finish IBR 10, removing the melting layer without causing a great reduction in the compressive residual stresses from peening. This can be done quickly due to IBR 10 being connected to the fixture throughout the entire cutting, peening and finishing process.

Figure 3:
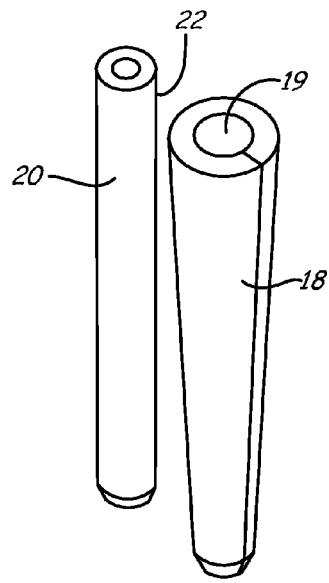
FIG. 3 is a view of a cutting tool and a laser tool of an integrated manufacturing and peening apparatus.

FIG. 3 is a view of cutting tool 18 and laser tool 20 of integrated manufacturing and peening apparatus 16. Cutting tool 18 includes spindle 19, and peening tool 20 includes line laser beam 22.

Peening tool 20 can have a tapered or cylindrical geometry. Peening tool 20 can include a neodymium-doped yttrium aluminium garnet (Nd:YAG) or neodymium:glass (Nd:glass) laser, excimer lasers or pulsed Co2 lasers. Line laser beam 22 can be formed and delivered to peening tool 20 by fiber optic arrays which deliver laser to peening tool 20 and direct it in a line formation towards airfoil 13. In a specific embodiment, a high-energy, pulsed Nd:glass laser with a wavelength of 1.054 µm delivers laser pulses of about 8 to 40 nanoseconds. This results in a power density of about 5-10 GW/cm$^2$. Line laser beam 22 can be about the height of airfoil 13 to peen the entire height of airfoil 13 in one pass.

Peening tool 20 uses line laser beam 22 to LSP a large portion of airfoil at one time, making peening tool 20 more efficient than past LSP systems. Past LSP systems typically used a point laser with a small circular spot about 5 mm in diameter. This resulted in a labor-intensive, time consuming and very expensive process to LSP each airfoil of an integrally bladed rotor. Peening tool 20 can significantly increase efficiency of the LSP process the use of line laser beam 22, which can peen large portions of an airfoil a one time.

Figure 4:
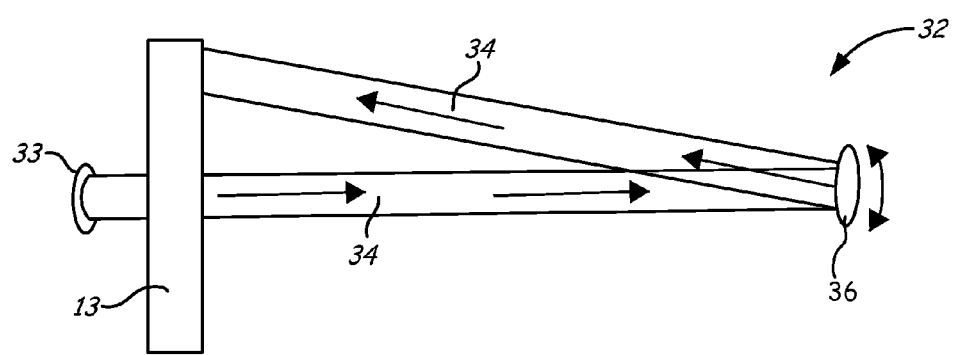
FIG. 4 shows an embodiment of a way to form a line laser peening process with a mirror system.

FIG. 4 shows an embodiment of a way to form line laser beam 22 with mirror system 32. FIG. 4 includes airfoil 13 and mirror system 32 with laser output 33, laser beam 34 and mirror 36.

Mirror 36 can be a cylinder mirror. Laser output 33 directs laser beam 34 towards mirror 36. Mirror 36 focuses laser beam 34 on airfoil 13 surface, forming a line. The line moves over the surface of airfoil 13 by tilting mirror 36 with a Goniometer or by rotating mirror 36.

Mirror system 32 forms line laser beam to efficiently peen airfoil 13 surfaces. This can form a line laser of about 13 mm in length. Types of lasers used as the peening source, can include a Nd:YAG laser, a fiber laser, a semiconductor laser, a dye laser and a gas laser. The Nd:YAG laser can, for example, deliver a nano-second pulse with 2.5 Joules of energy.

Figure 5A:
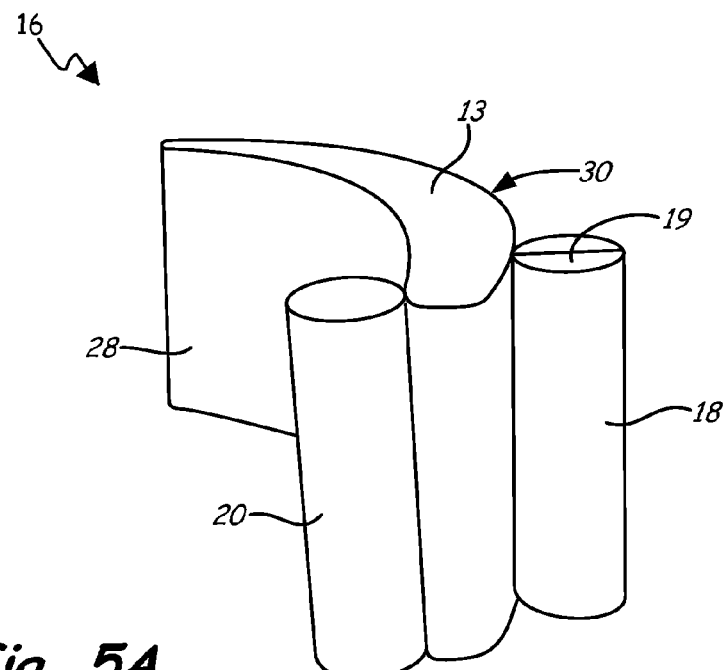
FIG. 5A is a perspective view of an integrated manufacturing and laser peening apparatus starting to machine and peen airfoil.
Figure 5B:
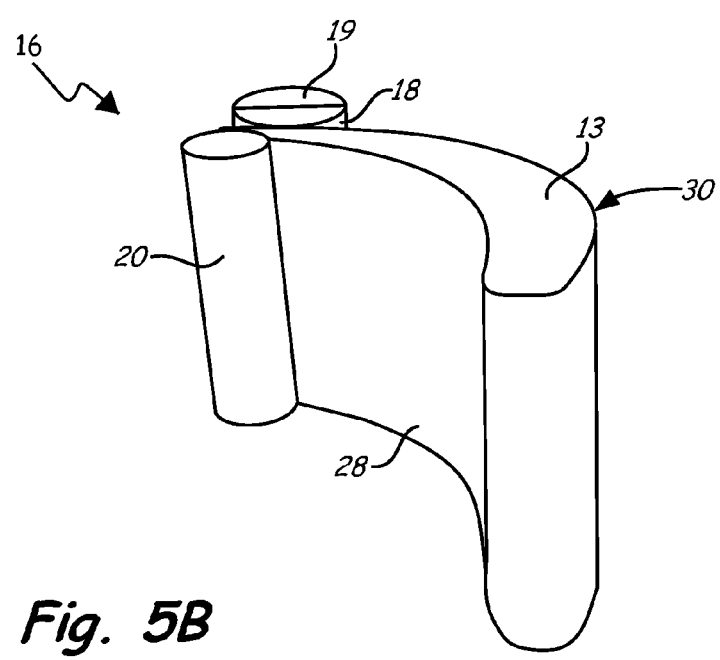
FIG. 5B is a perspective view of the integrated manufacturing and laser peening apparatus of FIG. 5A finishing machining and laser peening airfoil.

FIG. 5A is a perspective view of integrated manufacturing and peening apparatus 16 starting to machine and peen airfoil 13. FIG. 5B is a perspective view of integrated manufacturing and peening apparatus 16 finishing machining and peening airfoil 13. FIGS. 5A-5B include airfoil 13 with first surface 28 and second surface 30; and integrated manufacturing and peening apparatus 16, which includes cutting tool 18 with spindle 19, peening tool 20 with line laser 22 and controller 24 (not shown).

FIG. 5A shows peening tool 20 and cutting tool 18 in a first position, as it is starting to cut and peen airfoil 13. Controller 24 controls peening tool 20 and cutting tool 18 to move simultaneously along first surface 28 and second surface 30 of airfoil 13 to second position, as shown in FIG. 5B. Cutting tool 18 can be cutting airfoil 13 or simply positioned along to support second surface 30 of airfoil 13 while peening tool 20 peens first surface 28.

Figure 6:
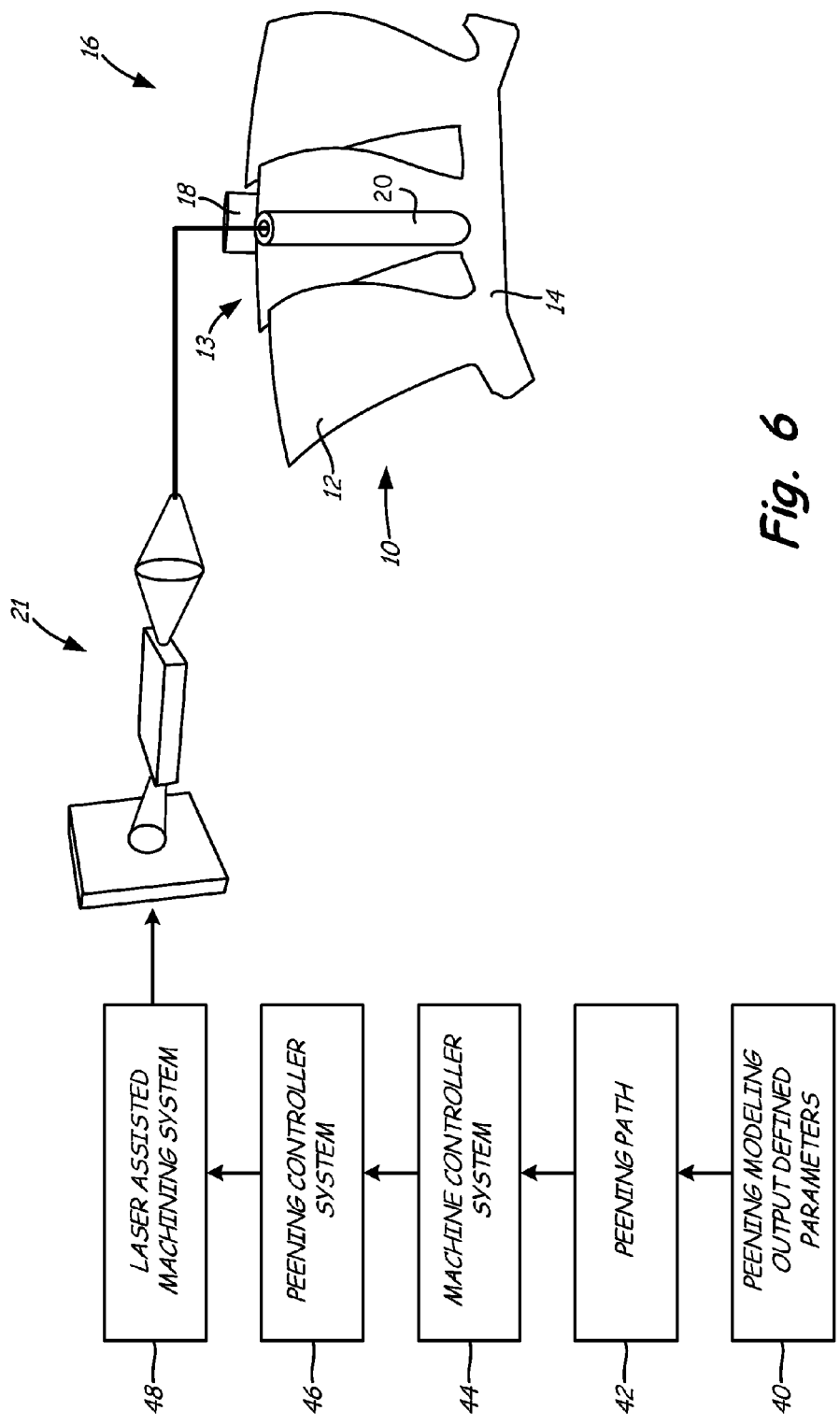
FIG. 6 is a schematic of an integrated manufacturing and laser peening system.

FIG. 6 is a schematic of an integrated manufacturing and laser peening system. FIG. 6 includes integrated manufacturing and peening apparatus 16 (with cutting tool 18, peening tool 20 with fiber optic system 21 to produce line laser 22) and controller 24 (not shown); a portion of IBR 10 with blades 12 (with airfoils 13) and disc 14; and boxes representing different operational considerations, parameters and steps 40, 42, 44, 46 and 48.

Peening modeling output defined parameters (box 40) represents developed models that run to identify peening parameters such as laser power, laser density and laser area. Peening path (box 42) represents computer-aided manufacturing ("CAM") software to define a laser tool path and corresponding operational parameter. Machine controller system (box 44) and peening controller system (box 46) represent that the laser path will be fed to the machine controller and the laser system controller to correlate part motion with laser peening applications. Laser assisted machining system (box 48) represents control for a laser assisted machining system to generate the required power density of a laser beam 22 to be carried through fiber optic system 21 and delivered to peening tool 20.

In summary, integrated manufacturing and peening apparatus 16 efficiently and economically forms, surface enhances and finishes a workpiece through the use of cutting tool 18, peening tool 20 with line laser 22 and controller 24. By using integrated apparatus 16, workpiece does not have to be removed from fixture for surface enhancement (peening), greatly reducing the total process time. Additionally, cutting and peening can be performed simultaneously, making this especially useful on parts with complex geometries, such as IBR 10. Apparatus 16 also eliminates the need for post processing preparation through coating blades protect surfaces from damage by ablation and melting due to the ease of machine finishing after peening on apparatus 16. Integrated apparatus 16 minimizes deformation due to peening by utilizing cutting tool 18 as a support on a surface adjacent to the surface being peened and eliminates the need for a separate peening system.

While the integrated manufacturing and peening apparatus 16 has been discussed in relation to forming IBR 10, it can be used to form any part that is manufactured by machining and requires surface enhancement (peening). Additionally, the lasers discussed for peening are set forth for example purposes only and can vary depending on system requirements.

While the invention is described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method of surface processing and machining a workpiece with an apparatus comprising a cutting tool, a peening tool and a controller, the method comprising:
    cutting a first surface of a workpiece with the cutting tool;
    peening the first surface of the workpiece with the peening tool that focuses a laser beam onto the first surface of the workpiece; and
    supporting a second surface of the workpiece with the cutting tool without cutting the second surface, wherein the supporting of the second surface of the workpiece is performed while the peening of the first surface of the workpiece is performed by the peening tool.

* * * * *